Figure 1:
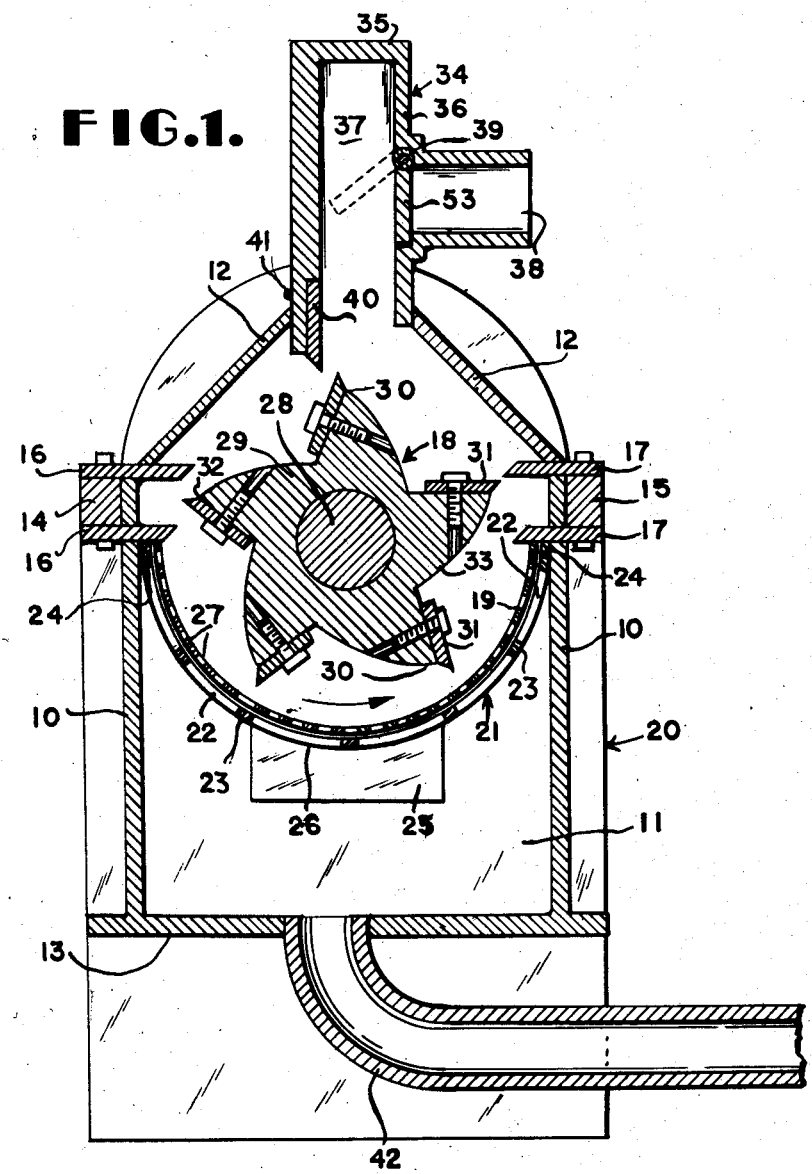

May 19, 1953      I. HINERFELD      2,639,096
MEANS FOR GRANULATING PLASTIC MATERIALS
Filed Dec. 28, 1950      2 Sheets-Sheet 2

IRVING HINERFELD
INVENTOR

Patented May 19, 1953

2,639,096

UNITED STATES PATENT OFFICE 2,639,096

MEANS FOR GRANULATING PLASTIC MATERIALS

Irving Hinerfeld, New York, N. Y.

Application December 28, 1950, Serial No. 203,189

1 Claim. (Cl. 241—222)

This invention relates to a novel granulating machine and associated mechanisms for reducing cellulose acetate or similar thermoplastic resins from bulk to small particulate size thereby rendering said plastic material suitable for use as a molding powder for injection molding or in similar manufacturing processes.

In the manufacture of cellulose acetate the ultimate steps in the process result in the production of a soft, doughy mass of plastic material having incorporated therein a considerable quantity of volatile solvents. The material as removed from a Banbury mill or similar mixing or kneading device is usually in the form of large doughy chunks or slabs. In order to produce a granular material or molding powder suitable for use in further manufacturing operations such as injection molding it is necessary to reduce these chunks or slabs of malaxated material to relatively small granules or pellets. It has been the usual practice to accomplish this after the removal of the slabs from the mill or similar device by passing them through rolls in order to reduce the slabs to relatively thin sheets. The sheets are then heated or dried for the purpose of removing the volatile solvent materials and the hardened sheets thus produced are then chopped or granulated to suitable particulate or molding powder form. It will thus be seen that considerable processing of material is required after its removal from the mill. It should also be noted that the solvents used in the manufacturing process of the plastic are highly noxious and objectionable and considerable problems are involved in the removal of the fumes engendered thereby.

It is an object of this invention to provide means whereby slabs of doughy material as they are removed from the mill, may be readily reduced to granular form in a simple and efficient manner.

Another object of this invention is to permit the production of granular molding powder directly from the plastic material in slab form, and to eliminate the problems involved in the steps of sheet formation and solvent removal.

A further object of this invention is to provide means for the production of cellulose acetate or similar plastic molding powder which is of substantially uniform particle size and which contains a minimum quantity of fines or granules of smaller than desired size.

A still further object of this invention is to provide means for producing molding powder of the character indicated wherein the volatile solvent materials may be readily removed in a safe and efficient manner during the granulation process.

It is also an object of this invention to provide means whereby the soft and doughy particles are kept separated from each other and prevented from coalescing or agglomerating until they have reached a sufficiently hardened state to eliminate any adhesion between granules.

In order to accomplish these and other objects a granulating mechanism is provided for reducing the doughy mass of plastic material to suitable particle size; a feed chute is provided for the granulating mechanism wherein the slabs of material may be readily and safely introduced for granulation; means are also provided for continuously removing the granulated material from the granulating zone as soon as the plastic material has been reduced to the desired particle size and additional means are provided for maintaining the granulated particles separate and apart as discrete particles until they have lost a sufficient amount of volatile solvent material and the particles are sufficiently cool and hard to prevent any agglomeration or adhesion between them. To accomplish these objects provision is made for an elongated outlet tube or separation zone from the granulating mechanism, which may be varied in length as desired, and the entire granulating and outlet or separator arrangement is constantly subjected to a current or stream of air which simultaneously removes the noxious solvent fumes and cools the resin and also the entire mechanism.

Other and further objects, benefits and advantages of this invention will become apparent from the description thereof contained in the annexed drawings, specifications and claims or will otherwise become obvious. It will be understood that the invention herein disclosed may be employed for other purposes for which the process, structure and arrangement are adapted.

Figure 2:
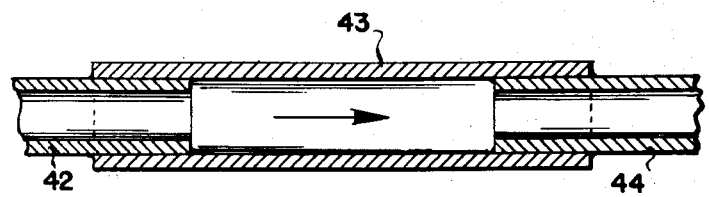
Figure 3:
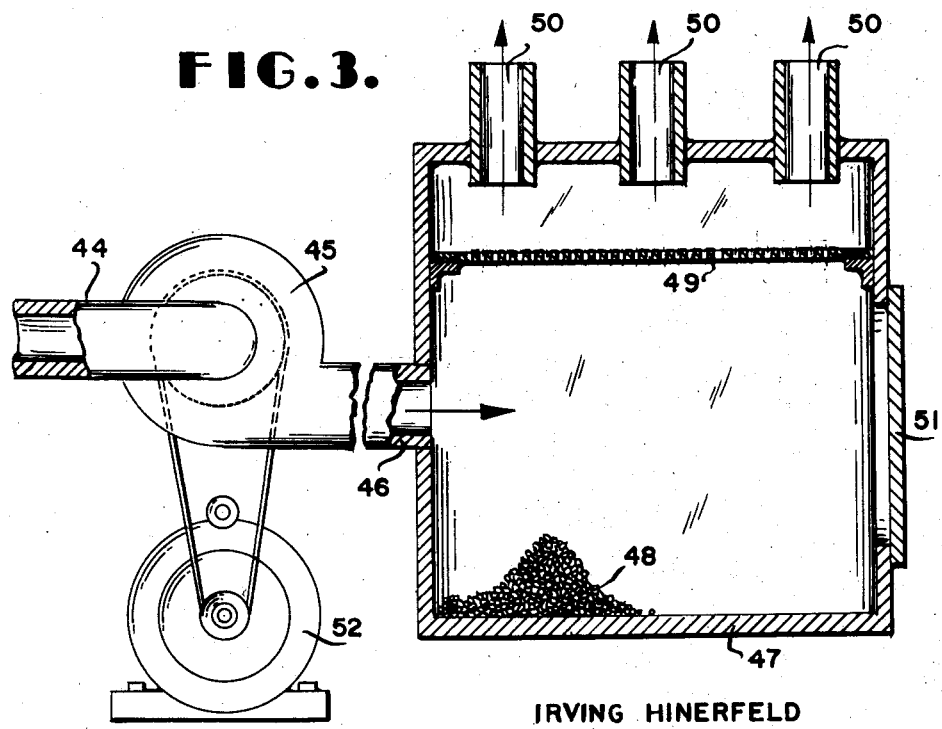

In the accompanying drawings:

Figure 1 is a vertical cross-section of the granulating mechanism portion of the present invention, Figure 2 is a vertical cross-section of a portion of tubes comprising the separation zone, and Figure 3 is a view of the discharge end of the mechanism comprising the present invention showing the collector container in cross-section.

As shown in Figure 1 the granulating portion of the mechanism comprises an enclosed housing having side, end, top and bottom walls 10, 11, 12, and 13 respectively, one of said end walls not being shown. The housing is designated generally by the numeral 20. Rigid bars of metal 14 and 15 of rectangular cross section are secured between end walls 11 and have bolted thereto pairs of substantially horizontal knives 16 and 17 whose cutting edges extend into the interior of the housing and are adapted to cooperate with the cutting blades mounted on the rotary cutter assembly 18 as will more clearly appear hereafter. The interior of housing 20 is divided into an upper and lower compartment by means of semicylindrical foraminous screen 19. A cradle 21 comprised of a series of spaced semi-circular ribs 22 and a series of spaced longitudinal spacing bars 23 secured to each other at their points of contact, supports the screen. The upper edges 24 of the screen and cradle are secured to side walls 10 in a rigid manner. Additional support for the screen and cradle assembly is provided by means of plates 25 secured to the interior surface of each of the end walls and provided with concave upper edges 26 conformed to the curvature of the semi-circular ribs at each end of the cradle and positioned in contact with the lower surfaces of said ribs. Screen 19 is provided with a series of holes or perforations 27 of a suitable size, the actual choice being dependent upon the particle size desired to be produced by the machine. The screen is located in spaced relation to rotary cutter assembly 18 and is co-axial therewith.

Rotary cutter assembly 18 is located in the upper compartment of the housing formed by the screen and is comprised of a horizontal shaft 28 journaled in the end walls of the housing having mounted thereon cutter head 29 for rotation therewith. One end of shaft 28 extends beyond one of the end walls of the housing and is connected to a suitable source of rotary motive power such as an electric motor by appropriate pulleys, not shown. Cutter head 29 is provided with a plurality of radially projecting teeth 30 each of which is provided with a plane leading surface 32 to which a rotary cutter blade or knife 31 is suitably secured as by means of bolts. The trailing surface 33 of each of teeth 30 presents a smooth arcuate surface, the purpose of which will more clearly appear hereafter.

A slab of material to be granulated is fed into the machine through vertically disposed feed chute 34 which has access to said housing through its top wall 12. Feed chute 34 is substantially rectangular in horizontal cross-section and is provided with a top wall 35 in addition to side and end walls 36, 37 respectively, which entirely enclose the chute. One of side walls 36 is provided with a horizontally disposed feed port 38. A loosely fitting flap or door 53 is hingedly secured to the side wall of the chute at 39 and acts as a baffle to permit the introduction of an entire slab of plastic material into the chute; while closing off the opening in the chute during the granulating operation in order to prevent the accidental ejection of the material from the machine. A fixed vertically disposed cutter blade or knife 40 is secured to the opposing side wall 36 of the chute as by means of bolt 41. Said fixed blade is positioned so as to cooperate with the cutter blades of the rotary cutter assembly. It should be noted that the exposed surface of cutter blade is flush with and forms a smooth continuation of the interior surface of the side wall to which it is secured.

As the slab drops to the bottom of the chute, the arcuate surface of the trailing edge of each of the teeth of the rotary cutter acts to limit the downward movement of the slab and determines the maximum size of the portion of the slab which will be sheared by the cooperative action of the fixed and rotary blades. The impact of the knives with the slab removes a portion thereof and propels the remainder upwardly in the chute. The force of this impact is at times sufficiently great to cause the slab to reach the top of the chute and hence top wall 35 is provided to retain the slab within the chute. As the slab falls back it is again subjected to the shearing action of the vertical and rotary knives and the process is continuously repeated. In this manner the slab automatically feeds itself into the machine.

The sheared portions of the material are then thrown against the horizontal knives and a granulating zone is established particularly in the region of the semi-cylindrical screen. The granulation process is progressively carried on until granules of sufficiently small size to pass through holes 27 in the screen have been produced. These granules are then drawn through the screen and removed from the granulating portion of the machine by means of the current of air produced by suction blower 45 as will more clearly appear hereafter.

The granulated material is discharged from the granulating portion of the machine through outlet tube 42 which communicates with the bottom wall of housing 20. As shown in Figure 2, outlet tube 42 slideably interconnects with intermediate tube 43 which in turn is slideably connected with tube 44 carried by suction blower 45 shown in Figure 3. The discharge end or tube 46 of the suction blower communicates with a collecting container 47 in which the granular material is ultimately deposited as shown at 48. An electric motor 52 is suitably connected to the suction blower by means of a belt and pulleys in order to impart motive power thereto. Collecting container 47 comprises an enclosed receptacle which is provided with a screen 49 adjacent its upper portion and with exhaust tubes 50 which open to the atmosphere or may be connected to suitable vents for the escape of fumes therefrom. The collecting container is also provided with a removable door 51 through which the granulated material collected therein may be removed.

The operation of the arrangement will now be described.

Motive power is applied to the rotary cutter assembly as well as to the suction blower thereby initiating a flow of air from the feed port through the blower, into the collecting container and out of the exhaust tubes in said container. A malaxated or doughy chunk or slab of cellulose acetate or similar plastic material is then introduced into the chute through the door or flap in the feed port. As the slab drops into the chute, the flap door automatically swings shut providing a substantially continuous wall for the chute. As the bottom portion of the soft doughy slab reaches the bottom of the chute it may contact the arcuate surface of a tooth or be caught in mid-air and in the space above said surface and is struck by one of the knives of the rotary cutter assembly and forced against the vertical cutter blade. The cooperative shearing action of the rotary and fixed vertical knives remove a portion from the slab. The impact of the rotary blades with the slab is of such force as to propel the entire slab upwardly through the chute as each blade strikes, the force of the impact being sufficiently great to cause the slab to strike the top wall of the chute. As the slab again drops to the bottom of the chute, the shearing action is repeated. The material sheared from the slab is immediately carried against the horizontal knives and a cutting zone is established as the cutting blades of the rotary assembly carry the material and come into cutting or shearing relation with the fixed knives. The rotary assembly is operated at high speed and the material turns with the rotor and centrifugal force which subjects the material to the cutting and shearing operation of the knives and rapidly reduces the material to granular form. The continuous operation of the suction blower simultaneously causes a current of air to flow from the feed port through the grinding zone and semicylindrical screen. As the plastic material is reduced to a sufficiently small size to pass through said screen it is drawn therethrough and out of the cutting zone by means of said continuous current of air. It should also be noted that the current of air flowing through this portion of the device simultaneously draws with it the noxious fumes of the volatile solvent materials present in the plastic. The formation of fines is prevented since the granules or particles are removed as soon as they are sufficiently small to pass through the screen. The soft doughy state of the material at this stage also prevents the formation of such fines.

As the granulated material is drawn through the screen it passes from the housing into outlet tube 42. At this stage the particles or granules which are still in a somewhat soft and doughy state and still contain volatile solvents would tend to coalesce with each other. In order to prevent any adhesion or coalescence between the individual particles or granules a separating zone is provided by means of intermediate tube 43 which leads into the suction blower through tube 44. In this zone the discrete particles continue to be carried by the continuous current of air. However, since the weight and surface area of the particles is not absolutely uniform, the velocity of each of the particles varies and prevents the granules from contacting each other for any appreciable length of time. In this manner the granules are kept separate and apart from each other and any coalescence between them is effectively prevented. Additionally the plastic material in this divided form presents a relatively large surface area to the current of air and thereby permits a rapid removal of the volatile solvents present.

The separating zone is actually comprised of three sections namely the outlet tube 42, intermediate tube 43 and tube 44. The sliding interconnection between the tubes results in a telescopic arrangement which permits the length of the separating zone to be adjusted as desired for various particle or granule sizes. In this arrangement the adjustment of the length of the separator zone is accomplished by adjusting the distance between the housing and the suction blower and collecting container. The adjustment of the length of the tube also permits the length of time during which the particles dwell in the separating zone to be varied for adequate solvent removal.

As the particles pass from the separating zone through the suction blower sufficient of the solvent has been removed and the particles have become sufficiently cool and hard to prevent any further possibility of coalescence between them and they are then deposited in the collecting container where they drop to the bottom. The fumes carried by the current of air are forced through the screen and exhaust tubes. The screen acts to prevent the escape of any of the particles which may be carried upwardly by the air current. The entire collecting container may advantageously be placed in a suitable ventilated room or appropriate vents to the atmosphere may be connected to the exhaust tubes.

It will be noted from the foregoing that by means of this arrangement a closed system is provided for granulating cellulose acetate or similar plastic materials without permitting the undesired escape of the noxious fumes usually attendent upon such process. The granulation of the material may be carried on immediately as the malaxated mass of material is removed from the mill or similar device without the necessity of intermediate processing such as sheet formation or drying. A substantially uniform product is produced wherein the quantity of fines is reduced to a minimum and is particularly suitable for use as a molding powder. The machine and the plastic material are constantly cooled by the air current. As a result of this cooling action the plastic material is rapidly cooled until it reaches a hardened state and is finally deposited in a form suitable for use as a molding powder.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

I claim:

In a device for reducing a doughy slab of plastic material to granular form, a housing, a rotary cutter assembly extending across said housing and carrying cutter blades, an enclosed vertical feed chute having a top, side and end walls, the bottom end of said chute being open and in communication with said housing, an opening on one of the side walls of said chute, a flap hingedly secured to a wall of said chute pendantly closing said opening, a feed port for introducing a slab of doughy plastic material into said chute, a fixed cutter blade secured to a side wall of said chute at its lower extremity and flush with and comprising a smooth continuation of the interior surface thereof, whereby said blade permits the free vertical movement of said slab within said chute, said blade extending into said housing in cooperative relation to the blades of the cutter assembly whereby a slab of material positioned within said chute is constantly subjected to the shearing action of said blades and is continuously reciprocated within said chute.

IRVING HINERFELD.

References Cited in the file of this patent

UNITED STATES PATENTS

| Number | Name | Date |
|---|---|---|
| Re. 16,759 | Snyder | Oct. 4, 1927 |
| 448,516 | Gardner | Mar. 17, 1891 |
| 845,721 | Sovereign | Feb. 26, 1907 |
| 1,213,896 | Palmer | Jan. 30, 1917 |
| 1,401,795 | Kohler et al. | Dec. 27, 1921 |
| 1,613,048 | Mitts | Jan. 4, 1927 |
| 1,666,797 | Snyder | Apr. 17, 1928 |
| 1,771,140 | Novatny | July 22, 1930 |
| 1,910,519 | Clark | May 23, 1933 |
| 2,013,808 | Robinson | Sept. 10, 1935 |
| 2,047,136 | Doyle | July 7, 1936 |
| 2,149,289 | Hall | Mar. 7, 1939 |
| 2,225,781 | Hinerfeld | Dec. 24, 1940 |
| 2,289,727 | Randolph | July 14, 1942 |
| 2,358,418 | Rosecky | Sept. 19, 1944 |
| 2,381,775 | Roddy | Aug. 7, 1945 |
| 2,426,346 | Feight | Aug. 26, 1947 |
| 2,440,051 | Lind | Apr. 20, 1948 |
| 2,530,313 | Parten | Nov. 14, 1950 |